(12) United States Patent
Alves et al.

(10) Patent No.: US 11,757,368 B2
(45) Date of Patent: *Sep. 12, 2023

(54) TRANSFORMER ARRANGEMENT

(71) Applicant: Hitachi Energy Switzerland AG, Baden (CH)

(72) Inventors: Roberto Alves, Västerås (SE); Nan Chen, Västerås (SE); Frans Dijkhuizen, Skultuna (SE); Jan Svensson, Västerås (SE); Alireza Nami, Västerås (SE)

(73) Assignee: HITACHI ENERGY SWITZERLAND AG, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/639,117

(22) PCT Filed: Dec. 18, 2020

(86) PCT No.: PCT/EP2020/087235
§ 371 (c)(1),
(2) Date: Feb. 28, 2022

(87) PCT Pub. No.: WO2021/123317
PCT Pub. Date: Jun. 24, 2021

(65) Prior Publication Data
US 2022/0407429 A1     Dec. 22, 2022

(30) Foreign Application Priority Data

Dec. 20, 2019  (EP) .................................... 19218965

(51) Int. Cl.
*H02M 5/12* (2006.01)
*H02M 7/483* (2007.01)
(Continued)

(52) U.S. Cl.
CPC ............... *H02M 5/12* (2013.01); *H02M 1/34* (2013.01); *H02M 1/4233* (2013.01); *H02M 7/4835* (2021.05)

(58) Field of Classification Search
CPC ........ H02M 5/10; H02M 5/12; H02M 7/4835; H02M 1/34; H02M 1/4233
See application file for complete search history.

(56) References Cited

U.S. PATENT DOCUMENTS

2010/0201338 A1   8/2010   Haj-Maharsi et al.
2010/0220499 A1   9/2010   Haj-Maharsi et al.
(Continued)

FOREIGN PATENT DOCUMENTS

CN   104052026 A   9/2014
CN   107910886 A   4/2018
(Continued)

OTHER PUBLICATIONS

"Xu, Z., Xiao, H., & Xu, Y.(2019). Two basic ways to realise DC circuit breakers. The Journal of Engineering, 2019(16), 3098-3105. doi:10.1049/joe.2018.8760".

(Continued)

*Primary Examiner* — Adolf D Berhane
(74) *Attorney, Agent, or Firm* — Sage Patent Group

(57) ABSTRACT

A transformer arrangement is provided. The transformer arrangement includes a transformer with a primary and a secondary winding and a chain link of switching blocks connected in series between one of the windings and a load, where the switching blocks comprise a first set of voltage contribution blocks and a second set of circuit breaker blocks, where the first set of voltage contribution blocks is configured to adjust a voltage output by the transformer with (Continued)

an offset voltage and the second set of circuit breaker blocks is configured to interrupt a current running through the chain link.

20 Claims, 4 Drawing Sheets

(51) Int. Cl.
*H02M 1/34* (2007.01)
*H02M 1/42* (2007.01)

(56) References Cited

U.S. PATENT DOCUMENTS

| | | |
|---|---|---|
| 2012/0281444 A1 | 11/2012 | Dent et al. |
| 2018/0026550 A1 | 1/2018 | Dent et al. |
| 2021/0359615 A1* | 11/2021 | Halfmann ........... H02M 1/0095 |
| 2022/0344093 A1* | 10/2022 | Alves ................... H01F 27/402 |

FOREIGN PATENT DOCUMENTS

| | | |
|---|---|---|
| CN | 108233689 A | 6/2018 |
| CN | 110048377 A | 7/2019 |
| DE | 19933811 A1 | 2/2001 |
| EP | 3098925 A1 | 11/2016 |
| JP | 2014042453 A | 3/2014 |
| KR | 1020050049934 A | 5/2005 |
| KR | 1020110114697 A | 10/2011 |
| WO | 2019238239 A1 | 12/2019 |

OTHER PUBLICATIONS

Office Action for Chinese Patent Application No. 202080073586.8, dated Oct. 13, 2022, 4 pages.
International Search Report and Written Opinion of the International Searching Authority, PCT/EP2020/087235, dated Feb. 18, 2021, 14 pages.
Korean Decision for Grant of Patent, Korean Application No. 10-2022-7016311, dated Feb. 6, 2023, 4 pages.

* cited by examiner

TRANSFORMER ARRANGEMENT

CROSS-REFERENCE TO RELATED APPLICATIONS

This application is a 35 U.S.C. § 371 national stage application of PCT International Application No. PCT/EP2020/087235, filed on Dec. 18, 2020, which in turn claims foreign priority to European Patent Application No. 19218965.2, filed on Dec. 20, 2019, the disclosures and content of which are incorporated by reference herein in their entireties.

TECHNICAL FIELD

The present disclosure relates to a transformer arrangement for electrical power applications.

BACKGROUND

Transformers are important equipment in electric power applications such as power transmission, power distribution and power generation. At times there is a need to change the output voltage of such a transformer for a given input voltage. This type of change is typically made using a so-called tap changer, which changes the turns ratio between the windings.

The tap changer mechanism is typically expensive to implement and it is also slow.

There is in view of this a need for an improvement change in the way the output voltage of a transformer is influenced.

One way to combine a transformer with another piece of equipment is disclosed in US 2010/0220499. This document discloses a power electronic module (PEM) connected in series with one end of a transformer winding. The PEM performs current limitation, provides reactive power, controls power factor and reduces voltage fluctuations. The PEM comprises a filter and current limiter connected in parallel with a half or full-bridge circuit.

It is additionally often of interest to combine the transformer with other functionality such as current interruption functionality.

There is therefore still a room for improvement in the field, especially with regard to tap changer simplification or removal.

SUMMARY OF THE INVENTION

One object of the present disclosure is therefore to provide a transformer arrangement capable of performing current interruption with a simpler mechanical structure for output voltage adaptation (magnitude and/or phase of the voltage).

This object is according to a first aspect achieved through a transformer arrangement comprising a transformer with a primary and a secondary winding and a chain link of switching blocks connected to one of the windings and being connectable in series between one of the windings and a load, where the switching blocks comprise a first set of voltage contribution blocks and a second set of circuit breaker blocks, where the first set of voltage contribution blocks is configured to adjust a voltage output by the transformer with an offset voltage and the second set of circuit breaker blocks is configured to interrupt a current running through the chain link.

The chain link may be connected to a first end of the transformer winding and connected or connectable between the first end of the transformer winding and a first end of the load. As an alternative the chain link may be connected to a second end of the transformer winding and connected or connectable between the second end of the transformer winding and a second end of the load, which second end of the transformer winding may be a grounding end of the transformer winding.

When the chain link is connected to the first end of the transformer winding, it lacks a connection to the second end of this winding and when the chain link is connected to the second end of the transformer winding it lacks a connection to the first end of this winding.

The voltage contribution block may be a voltage contribution block with bipolar voltage contribution capability. It may thus be able to give a voltage contribution with two different polarities. This may be done using a full-bridge voltage contribution block. The voltage contribution block may additionally comprise a first energy storage element. Optionally it may also comprise a second energy storage element. The first energy storage element may be an element for short-term energy supply, such as a capacitor, and the second energy storage element may be an energy storage element for long term energy supply, such as a battery or a supercapacitor. The first energy storage element may be used for reactive power injection or withdrawal, while the second energy storage element may be used for active energy power injection or withdrawal.

The first set of voltage contribution blocks may be controllable to provide a positive or negative voltage contribution at a 90 degrees phase angle, i.e. a voltage contribution at a phase angle of $\pm\pi/2$, to the load current. This may be done in order to inject or withdraw reactive power, which injection and withdrawal may be performed using the first energy storage element, for instance if the voltage contribution block only comprises the first, energy storage element. Alternatively, the first set of voltage contribution blocks may be controllable to provide a positive or negative voltage contribution in a range of 0-360 degrees to the load current. This may be done in order to inject or withdraw active power using the second energy storage element.

The first set of voltage contribution blocks may be controllable to provide reactive power compensation. It may thus be controllable to inject or withdraw reactive power. It may in some realizations also be controllable to inject or withdraw active power.

The first set of voltage contribution blocks may additionally be controllable to regulate harmonics and/or flicker in the voltage output by the transformer.

The second set of circuit breaking blocks may in turn be controllable to interrupt the current through the chain link based on the detection of a fault.

At least some of the blocks may additionally be grouped into cells, where each cell comprises at least one voltage contribution block and at least one circuit breaking block.

The number of voltage contribution blocks used in the chain link may be selected for a desired voltage range of a voltage adjustment to be made to the voltage across the corresponding transformer winding for magnitude control or voltage phase control. The number of circuit breaker blocks may in turn be selected for achieving a desired current interrupting level.

The transformer may be a three-phase transformer comprising a primary side and a secondary side with primary and secondary windings, where each side comprises three windings and where there is an equal number of chain links as there are windings on a side, where each chain link is connected to a corresponding winding of one of the sides.

The above mentioned one side may be wye-connected, where each chain link is connected to a first end of the corresponding winding of the one side, with the second end of each winding being connected to a neutral. Alternatively, the above-mentioned one side may be delta-connected, where each chain link is connected to a first end of the corresponding winding of the one side, with the second end of each winding being connected to a chain link of another winding.

The transformer arrangement may additionally comprise a control unit configured to control the switching blocks of the chain link, which control may be the control of the switches in the switching blocks.

The various embodiments may provide one or more advantages. One advantage that may be achieved is a compact structure for adapting voltages of a transformer combined with current interruption capability. A simplification of the mechanical structure used for adjusting voltages in that a tap changer may be simplified or removed may be achieved. This also allows a faster voltage adjustment to be made compared with the use of a tap changer. The various embodiments may enable a continuous impedance regulation of the transformer. Various embodiments of transformer arrangement can additionally be used for several attractive additional purposes, such as positive or negative reactive power injection into the load and flicker and harmonics regulation

BRIEF DESCRIPTION OF THE DRAWINGS

The various embodiments will in the following be described with reference being made to the accompanying drawings, wherein.

DETAILED DESCRIPTION

The present disclosure concerns a transformer arrangement for use in electric power applications such as power generation, power transmission and power distribution.

Figure 1:
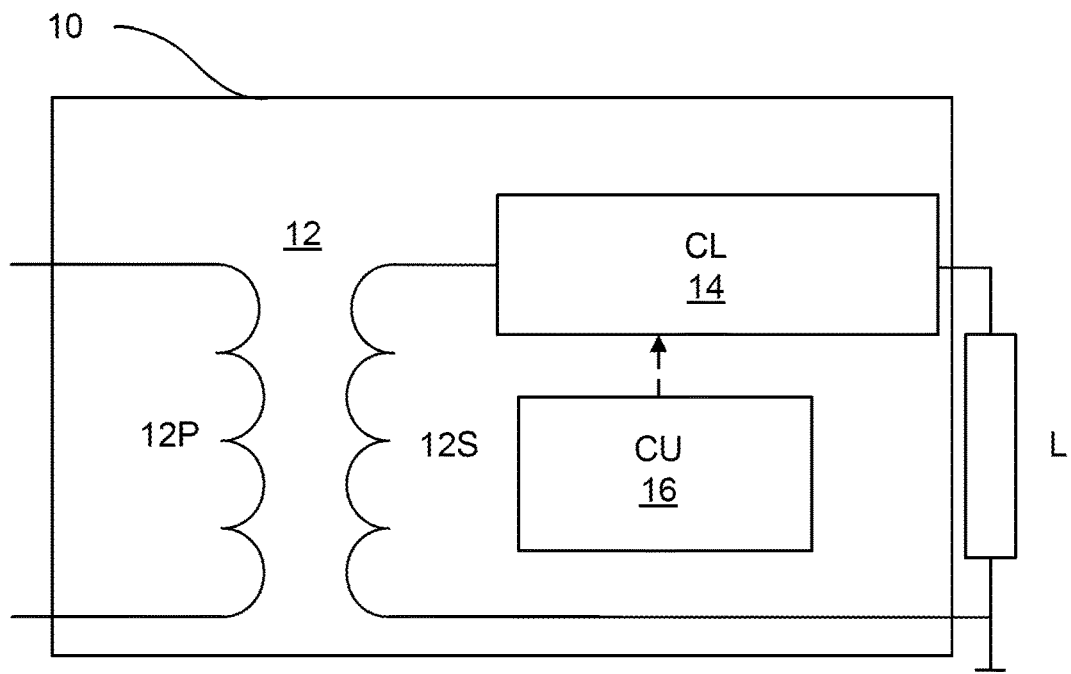
FIG. 1 schematically shows a transformer arrangement comprising a transformer, a chain link of switching blocks and a control unit controlling the chain link.

FIG. 1 schematically shows one realization of the transformer arrangement 10. This realization is a single-phase realization. As can be seen later, it is also possible to provide three-phase realizations of the transformer arrangement.

The transformer arrangement 10 comprises a transformer 12 having a first winding and a second winding magnetically coupled to each other, where the first winding in this case is also a primary winding 12P, while the second winding is a secondary winding 12S. The transformer arrangement 10 also comprises a chain link CL 14 of switching blocks, where each switching block comprises at least one switch. The chain link 14 is connected in series with one of the windings and in this case it is connected in series with the secondary winding 12S. The secondary winding may have two ends, where a first end is connected to a first end of a load L via the chain link 14 and the second end is connected to a second end of the load L. The first end of the secondary winding 12S may be a high potential end and the second end of the secondary winding 12S may be a low potential end. In this case the second end of the secondary winding 12S is also connected to ground and it is therefore also considered to be a grounding end. Thereby the second end of the secondary winding 12S is also a grounding end. Furthermore, the chain link is also connected between the first end of the secondary winding 12S and the first end of the load L. The chain link 14 may in this case also have a first and a second end, where the first end is connected to the first end of the secondary winding 12S and the second end is connected to the first end of the load.

The transformer arrangement 10 also comprises a control unit CU 16 configured to control the switching blocks and more particularity configured to control switches of the switching blocks. The control unit 16 may be realized as a computer. It may also be realized as a processor with associated program memory comprising computer instructions realizing the control functionality. The control unit 16 may additionally be realized as one or more dedicated circuits such as an Application-Specific Integrated circuit (ASIC) or Field-Programmable Gate Array (FPGA).

The switching blocks of the chain link may be of a first type and a second type, where the first type of switching block may be a type that provides voltage contributions from at least one energy storage element, such as from a capacitor. Therefore, this first type of switching block is a voltage contribution block. The second type of switching block may be of a type that interrupts the current running through the chain link. Current interruption is traditionally carried out using a circuit breaker. For this reason, the second type of switching block may be termed a circuit breaker block.

Figure 2:
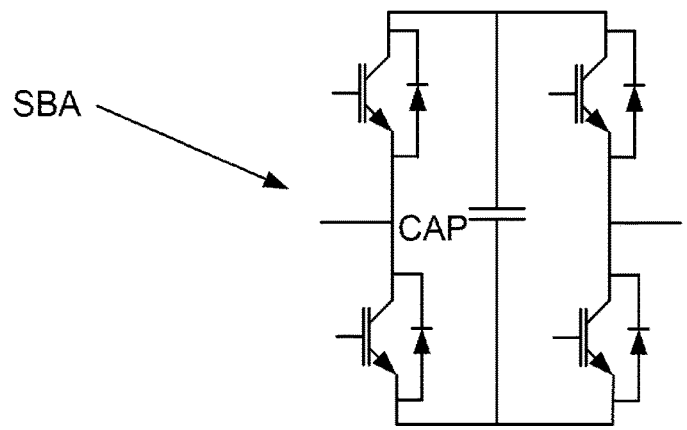
FIG. 2 schematically shows a first type of switching block used in the chain link.

FIG. 2 shows one realization of the voltage contribution block SBA. As can be seen, it comprises a first string of electronic switches and a second string of electronic switches, where each string of electronic switches comprises two electronic switches and a midpoint of the string provides a connection terminal of the switching block. A midpoint of the first string of electronic switches provides a first connection terminal and a midpoint of the second string of electronic switches provides a second connection terminal of the block. A first energy storage element in the form of a capacitor CAP is connected in parallel with the first and second strings of electronic switches. This type of block, which is a full-bridge block can be controlled to provide a voltage contribution of zero or the voltage of the first energy storage element with one of two different polarities. The voltage contribution block thereby also has a bipolar voltage contribution capability.

Figure 3:
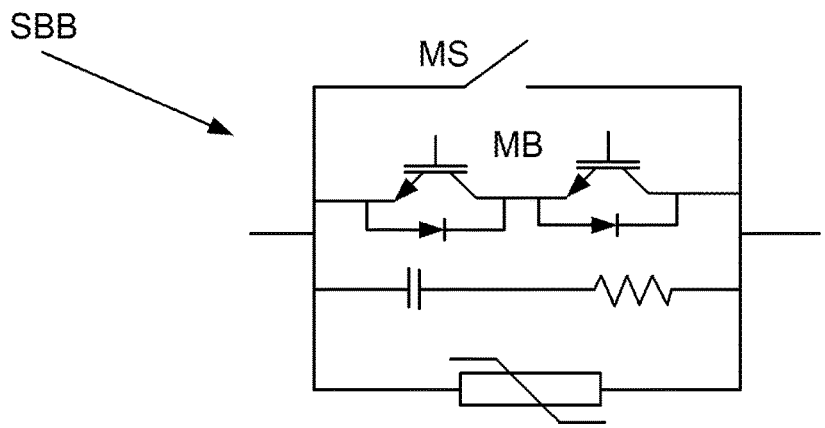
FIG. 3 schematically shows a second type of switching block used in the chain link.

FIG. 3 shows one realization of the circuit breaker block SBB. The circuit breaker block SBB has a first end providing a first connection terminal and a second end providing a second connection terminal. It also comprises a mechanical switch MS connected between the connection terminals. A main breaker MB is connected in parallel with the mechanical switch, which main breaker is made up of one or more electronic switches. There is also a snubber string comprising a capacitor in series with a resistor, which snubber string is connected in parallel with the main breaker and mechanical switch. Finally, there is a surge arrester connected in parallel with the snubber string, the main breaker and the mechanical switch. The mechanical switch is typically closed during steady state operation. When current interruption is needed, the mechanical switch is typically first opened in order to commutate the current over to the main breaker. This is followed by opening of the main breaker leading to the current being commutated over to the surge arrester, where it is quenched.

The switches in the blocks may be made up by transistors with or without anti-parallel diodes. For this reason, the transistors may as an example be Insulated-Gate Bipolar Transistors (IGBTs), Bi-mode Insulated Gate Transistors (BIGTs), Metal Oxide Semiconductor Field Effect Transistors (MOSFETs) and Junction Field Effect Transistors (JFETs). The semiconductors used in the switches may also be either Silicon or wide bandgap semiconductors such as Silicon Carbide or Gallium Nitride semiconductors.

Both types of blocks may be connected in cascade in the chain link, with the first connection terminal of a first switching block in the chain link being connected to the second end of the transformer secondary winding and the second connection terminal of the first block being connected to the first connection terminal of a second block, with the rest of the blocks in the chain link connected to each other in the same way.

There may be a first set of voltage contribution blocks in the chain link, where these voltage contribution blocks may be controlled by the control unit to form a voltage waveshape, such as a sinus waveshape. This may be done through controlling the switches of the voltage contribution blocks to bypass or insert the capacitor voltages with a positive or negative polarity. Thereby it is possible to create a waveshape providing an offset voltage $\Delta V$ with which the voltage across the secondary winding of the transformer is adjusted. The first set of voltage contribution blocks is thus configured to add the offset voltage, which may be positive or negative, to the voltage output by the transformer. Thereby the chain link may also be considered to form a voltage source. The offset voltage may be set to be a fraction of the voltage output by the transformer, which fraction may have an upper limit. The fraction may as an example be at most 30% of the voltage output by the transformer. However, the fraction may also be lower such as at most 20%, 15% or even 10%.

One steady state fault free operation of the transformer arrangement will now be described.

Figure 4:
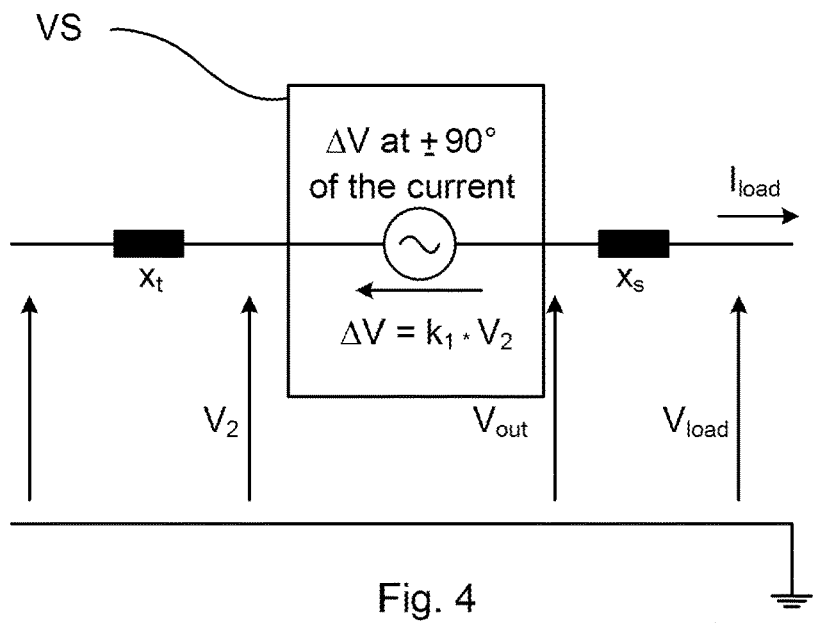
FIG. 4 schematically shows an equivalent circuit of the transformer arrangement.

FIG. 4 shows an equivalent circuit for the transformer arrangement. As can be seen in the equivalent circuit there is a first reactance $X_t$ (which represents the transformer short circuit reactance), which at a first junction is connected to a first end of a voltage source VS. A second end of the voltage source VS is in turn at a second junction connected to a first end of a second reactance $X_S$, where the second end of the second reactance $X_S$ (which represents the system line reactance) provides an output of the equivalent circuit. At the output of the equivalent circuit there is a first or load voltage $V_{load}$. Between the first junction and ground there is a second voltage $V_2$ and between the second junction and ground there is an output voltage $V_{out}$ of the voltage source VS.

As can be seen in FIG. 4, the voltage source VS provides an offset voltage $\Delta V$ that is shifted plus/minus ninety degrees, i.e. $\pm \pi/2$, compared with the load current $I_{load}$, i.e. the current being supplied to the load connected to the transformer arrangement. The offset voltage $\Delta V$ may be a fraction $k_1$ of the second voltage $V_2$, which is the voltage output by the transformer. Because of the used phase angles of $\pm \pi/2$, the offset voltage $\Delta V$ may also be seen as an equivalent impedance that is inserted by the chain link, which impedance may be a capacitance or/and inductance. The insertion of an inductance or a capacitance corresponds at some extent to a limited tap changer operation of changing the turns ratio of the transformer and/or a phase shift of the voltage.

The voltage offset may thus be a voltage offset that has a certain phase shift in relation to the load current, which may thus be $\pm \pi/2$.

Figure 5:
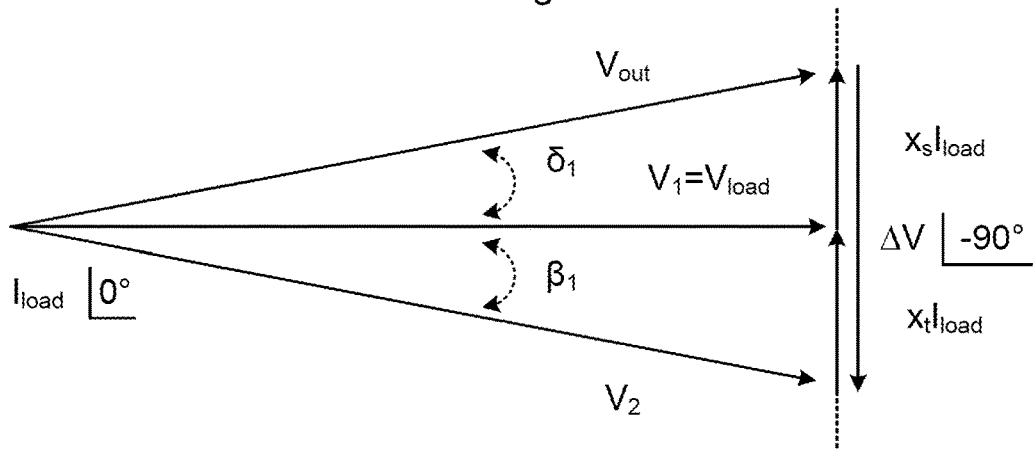
FIG. 5 shows phasors of voltages and currents in the equivalent circuit.

FIG. 5 shows a phasor diagram of the relationships between voltages and currents in the equivalent circuit. It can be seen that the transformer output voltage $V_2$ is phase shifted from the load voltage $V_{load}$ with an amount $\beta_1$ set by the perpendicular phasor of load current $I_{load}$ times the first reactance $X_t$ and that the output voltage $V_{out}$ is phase shifted from the load voltage $V_{load}$ with an amount $\delta_1$ set by the perpendicular phasor load current $I_{load}$ times the second reactance $X_S$. It can also be seen that the reactances are equally sized (in the example) and that therefore the phase angles $\beta_1$ and $\delta_1$ are equal, although this is no requirement. The offset voltage phasor $\Delta V$ has the opposite direction to the phasors $I_{load}*X_t$ and $I_{load}*X_S$. It is also equal in size to the sum of these two phasors.

Through the above-mentioned operation, which may be implemented under the control of the control unit 16, it is possible to have a continuous impedance regulation of the transformer. It is additionally possible to provide a voltage change without the use of a tap changer or with a tap changer of simpler realization. Thereby the transformer realization may be simplified and the whole arrangement may be made cheaper. Moreover, through the use of a chain link for adapting the voltage phase and/or magnitude, the voltage change operation may be much faster than if a tap changer were to be used.

The first set of voltage contribution blocks can additionally be used for positive or negative reactive power injection into the load.

Through also including a circuit breaker functionality, it is possible to operate the chain link as a circuit breaker, for instance when disconnecting the transformer arrangement due to faults or because maintenance is needed. The second set of circuit breaker blocks may thereby be configured to interrupt a current running through the chain link. The control unit may for this reason be configured to control the second set of circuit breaker blocks to interrupt the current through the chain link based on the detection of a fault, such as a fault in the phase to which the chain link is connected.

As was mentioned earlier, the chain link comprises both voltage contribution blocks and circuit breaker blocks. It should be realized that there may be as many voltage contribution blocks as are needed for a maximum sized offset voltage. The number of voltage contribution blocks used may thus be set for a desired voltage range of a voltage contribution to be added to the transformer voltage across a corresponding transformer winding used to change the transformer output voltage, which in this case is the transformer voltage across the secondary transformer winding. The number of circuit breaker blocks may in turn be a number of blocks required for breaking a maximum sized load current. The number may thereby be a number required for achieving a desired current interruption level.

Figure 6:
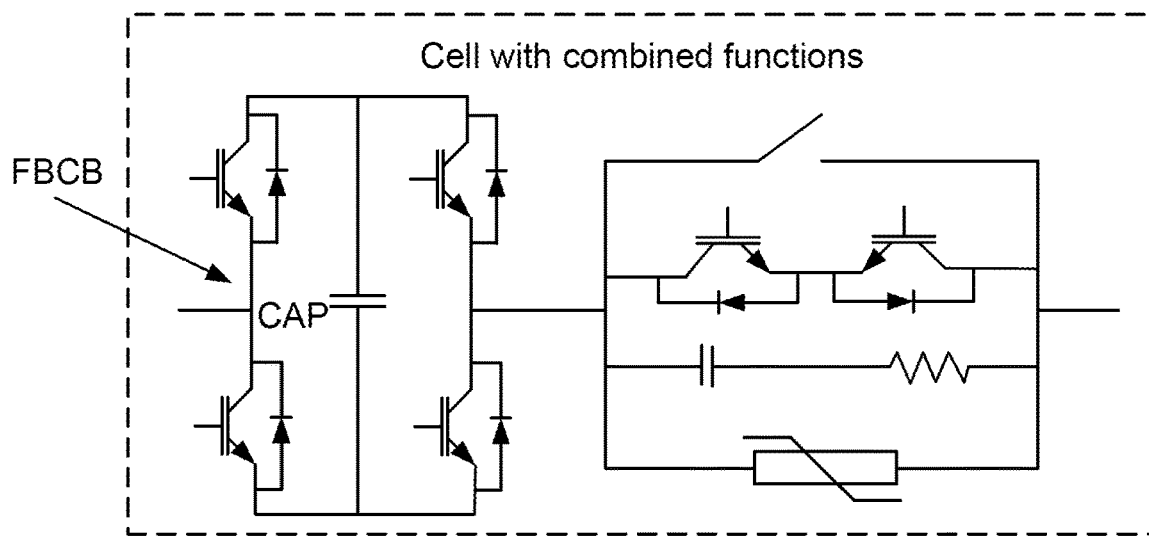
FIG. 6 schematically shows a cell formed through combining switching blocks of the first and the second type.

As can be seen in FIG. 6, a voltage contribution block may be combined with a circuit breaking block into a full bridge circuit breaker (FBCB) cell. A FBCB cell may comprise at least one voltage contribution block and at least one circuit breaker block. Depending on how many voltage contribution blocks and circuit breaker blocks that are needed, it is possible to have more than one block of one type than the other.

Figure 7:
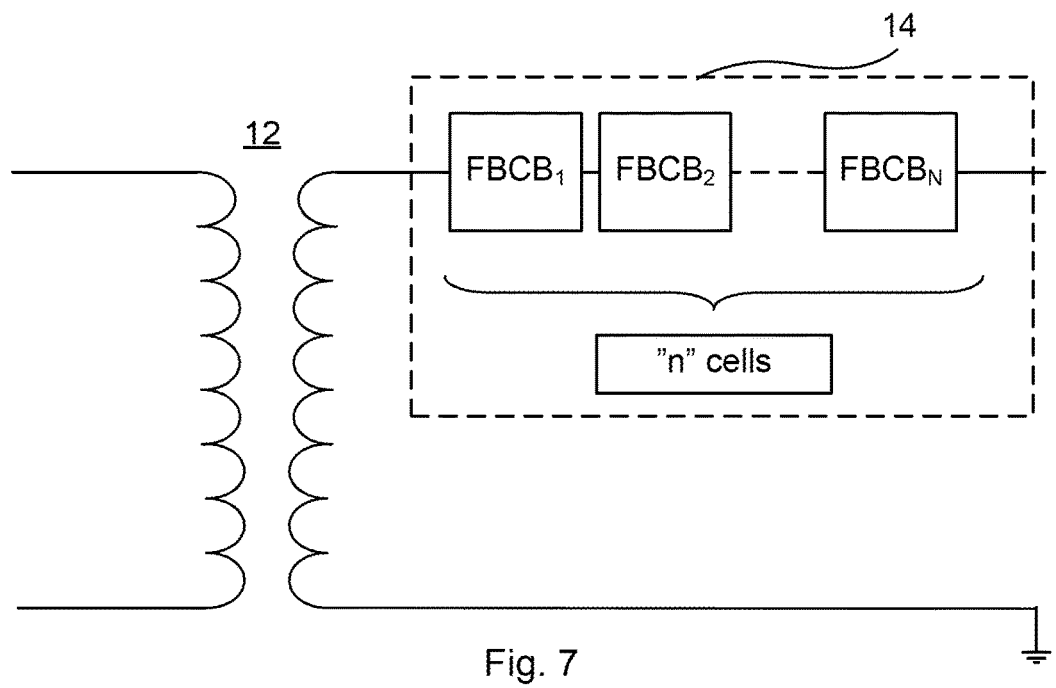
FIG. 7 shows the transformer arrangement of FIG. 1 equipped with cells in the chain link.

As can be seen in FIG. 7, the chain link can be made up of a number of FBCB cells. It is also possible to combine FBCB cells with either voltage contribution blocks and/or circuit breaker blocks in the chain link depending on the voltage contribution and current interruption demands.

Figure 8:
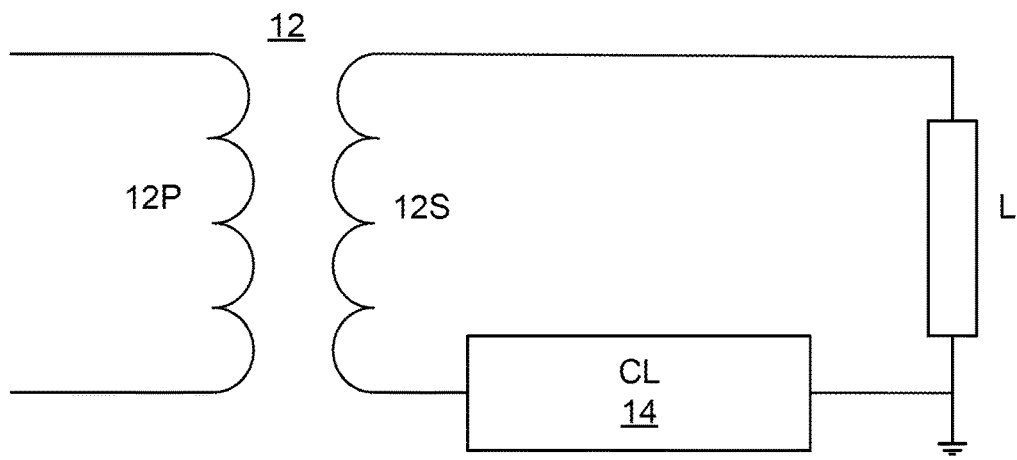
FIG. 8 shows the transformer arrangement with an alternative placement of the chain link.

There exist a number of possible further variations. As can for instance be seen in FIG. 8, the chain link 14 can be connected in the ground connection of the secondary transformer winding 12S instead. In this way the chain link 14 is connected between the second grounding end of the secondary winding 12S and the second end of the load L. Another possible alternative is to place the chain link on the primary side of the transformer.

Figure 9:
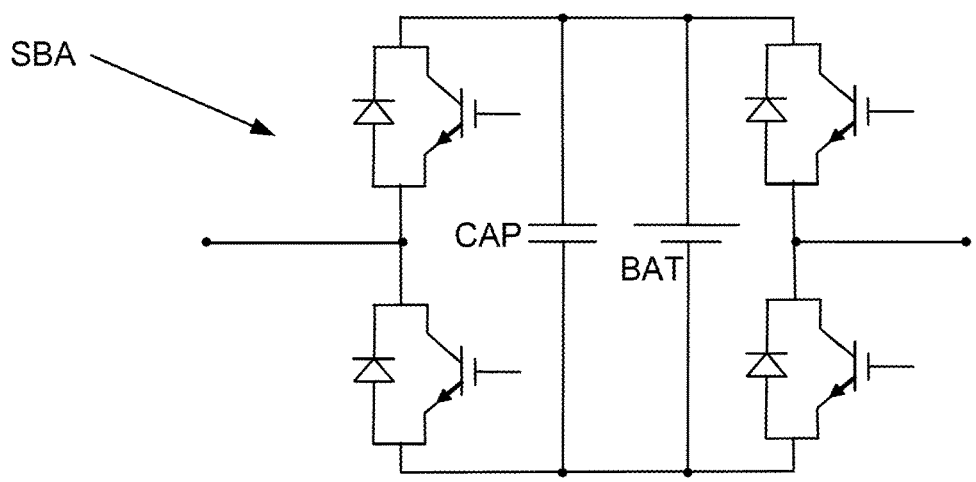
FIG. 9 shows a variation of the first type of switching cell.

In a further variation, each voltage contribution block comprises a second energy storage element in addition to the first energy storage element, where the second energy storage element may be connected in parallel with the first energy storage element. In case the first energy storage element is a capacitor, the second energy storage element may be a battery, supercapacitor or some other element for long-term energy delivery. This voltage contribution block realization is schematically shown in FIG. 9, where the first energy storage element is a capacitor CAP and the second energy storage element is a battery BAT. This type of voltage contribution block can be used to provide a voltage offset with other angles to the output current than $\pm\pi/2$. The phase shift may be in the whole spectrum of possible angles, i.e. in the range $0-\pm\pi$, and may thereby also be used for active power injection and withdrawal. Active power injection (positive or negative) provides a full control range of the injected voltage and independent voltage magnitude and voltage phase shift can be provided.

Another variation that can be implemented without the second energy storage element is to provide harmonic and/or flicker voltage regulation, under the control of the control unit, using the first set of voltage contribution blocks. This has the advantage of relaxing filtering requirements of any additional filters.

The chain link may be placed in the enclosure used for the transformer, which enclosure may be transformer tank. The chain link and transformer may thus be provided together in the transformer tank. As an alternative, the chain link may be provided in a separate enclosure.

Figure 10:
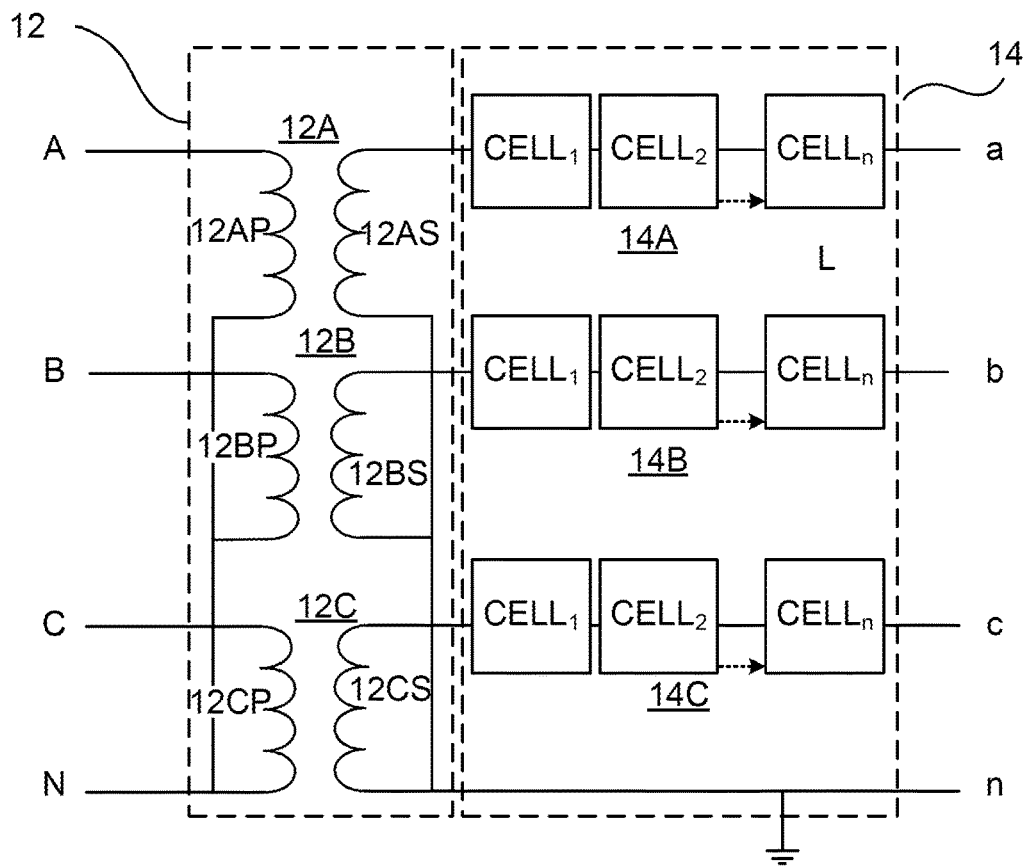
FIG. 10 shows a wye-wye connected three-phase realization of the transformer arrangement.
Figure 11:
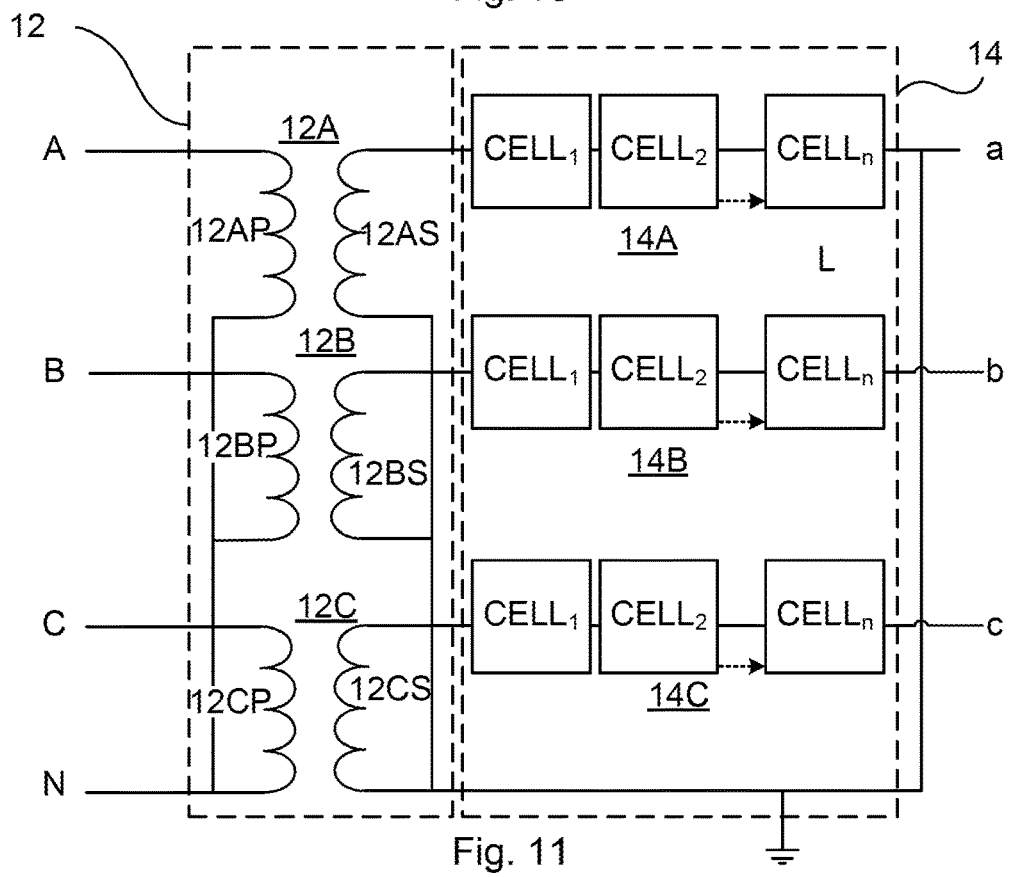
FIG. 11 shows a wye-delta connected three-phase realization of the transformer arrangement.

The transformer arrangement can also be a three-phase transformer arrangement comprising a primary side and a secondary side with primary and secondary windings. There is thus a winding pair 12A, 12B and 12C for every phase. Thereby the transformer has three primary windings 12AP, 12BP, 12CP and three secondary windings 12AS, 12BS and 12CS. There is also an equal number of chain links to the number of windings of a side, where each chain link is connected to a corresponding winding of one of the sides, which one side in this case is the secondary side. This is schematically shown in FIGS. 10 and 11. In this case, there is a first chain link 14A connected in series with the secondary winding 12AS for a first phase a, a second chain link 14B connected in series with a secondary winding 12BS for a second phase b and a third chain link 14C connected in series with a secondary winding 12CS for a third phase c. These chain links 14A, 14B, 14C are in the example connected to the first end of the secondary windings.

In FIG. 10, the transformer 12 has a wye-wye connection. Therefore, the first ends of the primary windings 12AP, 12BP and 12CP are each connected to a respective phase A, B, C, with the second side of each primary winding 12AP, 12BP and 12CP being connected to a neutral N. In this case, each chain link 14A, 14B and 14C also has a first end connected to the first end of the corresponding secondary winding 12AS, 12BS and 12CS and a second end connected to the corresponding phase a, b, c, while the second ends of the secondary windings 12AS, 12BS and 12CS are interconnected and connected to neutral n.

In FIG. 11, the transformer is wye-delta connected. The primary windings 12AP, 12BP, 12CP are thereby connected in the same way as in FIG. 10. Also, the chain links 14A, 14B and 14C are each connected to a corresponding phase in the same way as in FIG. 10. However, the second ends of each secondary winding 12AS, 12BS and 12CS is in this case connected to the chain link of another winding or of another phase. The second end of the secondary winding 12AS for the first phase a is thus connected to the second end of the second chain link 14B, the second end of the secondary winding 12BS for the second phase b is connected to the second end of the third chain link 14C and the second end of the secondary winding 12CS for the third phase c is connected to the second end of the first chain link 14A.

From the foregoing discussion it is evident that the present disclosure can be varied in a multitude of ways. It shall consequently be realized that the present subject matter is only to be limited by the following claims.

The invention claimed is:

1. A transformer arrangement comprising:
a transformer with a primary and a secondary winding; and
a chain link of switching blocks connected to one of the secondary windings and connectable in series between said one of the windings and a load, said switching blocks comprising a first set of voltage contribution blocks and a second set of circuit breaker blocks, where the first set of voltage contribution blocks is configured to adjust a voltage output by the transformer with an offset voltage and the second set of circuit breaker blocks is configured to interrupt a current ($I_{load}$) running through the chain link, wherein at least some of the blocks are grouped into cells, each cell comprising at least one voltage contribution block and at least one circuit breaking block.

2. The transformer arrangement according to claim 1, wherein the chain link is connected to a first end of the transformer winding and connectable between the first end of the transformer winding and a first end of the load.

3. The transformer arrangement according to claim 1, wherein the chain link is connected to a second end of the transformer winding and connectable between the second end of the transformer winding and a second end of the load, where the second end of the transformer winding is a grounding end.

4. The transformer arrangement according to claim 1, where the voltage contribution block is a bipolar voltage contribution block having a first energy storage element for short-term energy supply.

5. The transformer arrangement according to claim 4, wherein the first set of voltage contribution blocks is controllable to provide a positive or negative voltage contribution at a 90 degrees phase angle to the load current for injecting or withdrawing reactive power using the first energy storage element.

6. The transformer arrangement according to claim 4, wherein the bipolar voltage contribution block comprises a second energy storage element for long-term energy supply.

7. The transformer arrangement according to claim 6, wherein the first set of voltage contribution blocks is controllable to provide a positive or negative voltage contribution in a range of 0-360 degrees to the load current in order to inject or withdraw active power using the second energy storage element.

8. The transformer arrangement according to claim 1, wherein first set of voltage contribution blocks is controllable to regulate harmonics and/or flicker in the voltage output by the transformer.

9. The transformer arrangement according to claim 1, wherein the second set of circuit breaking blocks is controllable to interrupt the current through the chain link based on the detection of a fault.

10. The transformer arrangement according to claim 1, wherein the number of voltage contribution blocks are selected for a desired voltage range of a voltage adjustment to be made to the voltage across the corresponding transformer winding for magnitude control or voltage phase control and the number of circuit breaker blocks are selected for achieving a desired current interrupting level.

11. The transformer arrangement according to claim 1, wherein the transformer is a three-phase transformer comprising a primary side and a secondary side with primary and secondary windings, where each side comprises three windings and where there is an equal number of chain links, each connected to a corresponding winding of one of the sides.

12. The transformer arrangement according to claim 11, wherein said one side is wye connected, where each chain link is connected to a first end of the corresponding winding of said one side, with the second end of each winding being connected to a neutral.

13. The transformer arrangement according to claim 12, wherein said one side is delta-connected, where each chain link is connected to a first end of the corresponding winding of said one side, with the second end of each winding being connected to a chain link of another winding.

14. The transformer arrangement according to claim 1, further comprising a control unit configured to control the switching blocks of the chain link.

15. The transformer arrangement according to claim 1, wherein each circuit breaker block of the second set of circuit breaker blocks comprises:
a first end providing a first connection terminal;
a second end providing a second connection terminal;
a mechanical switch connected between the first connection terminal and the second connection terminal;
a main breaker connected in parallel with the mechanical switch, the main breaker comprising one or more electronic switches; and
a surge arrestor connected in parallel with the main breaker and the mechanical switch,
wherein a control unit closes the mechanical switch during steady state operation and when current interruption is required:
opens the mechanical switch to commutate current over to the breaker;
opens the main breaker to commutate current over to the surge arrestor where the current is quenched.

16. The transformer arrangement according to claim 15, wherein each circuit breaker block of the second set of circuit breaker blocks further comprises:
a snubber string connected in parallel with the main breaker and the mechanical switch, the snubber string comprising a capacitor in series with a resistor.

17. The transformer arrangement according to claim 15, wherein each of the one or more electronic switches comprises at least one of an insulated-gate bipolar transistor (IGBT), a metal oxide semiconductor field effect transistor (MOSFET), a bi-mode insulated gate transistor (BIGT), or junction field effect transistors (JFETs).

18. The transformer arrangement according to claim 1, wherein each voltage contribution block of the first set of voltage contribution blocks comprises:
a first string of electronic switches comprising two electronic switches connected to each other and a midpoint between the two electronic switches provides a first connection terminal of the voltage contribution block; and
a second string of electronic switches comprising two electronic switches connected to each other and a midpoint between the two electronic switches provides a second connection terminal of the voltage contribution block.

19. The transformer arrangement according to claim 18, wherein each voltage contribution block of the first set of voltage contribution blocks further comprises an energy storage element connected in parallel with the first string of electronic switches and the second string of electronic switches.

20. The transformer arrangement according to claim 18, wherein each of the one or more electronic switches comprises at least one of an insulated-gate bipolar transistor (IGBT), a metal oxide semiconductor field effect transistor (MOSFET), a bi-mode insulated gate transistor (BIGT), or junction field effect transistors (JFETs).

* * * * *